United States Patent
Wetzel et al.

(10) Patent No.: US 10,241,539 B2
(45) Date of Patent: Mar. 26, 2019

(54) SELF-SYNCHRONIZABLE NETWORK

(71) Applicants: TECHNISCHE UNIVERSITÄT DRESDEN, Dresden (DE); MAX-PLANCK-GESELLSCHAFT ZUR FÖRDERUNG DER WISSENSCHAFTEN E.V., Munich (DE)

(72) Inventors: Lucas Wetzel, Dresden (DE); Frank Jülicher, Dresden (DE); David Josef Jörg, Dresden (DE); Gerhard Fettweis, Dresden (DE); Wolfgang Rave, Pesterwitz (DE); Alexandros Pollakis, Dresden (DE)

(73) Assignees: TECHNISCHE UNIVERSITAT DRESDEN, Dresden (DE); MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 103 days.

(21) Appl. No.: 15/316,307

(22) PCT Filed: Jun. 22, 2015

(86) PCT No.: PCT/EP2015/064008
§ 371 (c)(1),
(2) Date: Dec. 6, 2016

(87) PCT Pub. No.: WO2015/193512
PCT Pub. Date: Dec. 23, 2015

(65) Prior Publication Data
US 2017/0139438 A1 May 18, 2017

(30) Foreign Application Priority Data
Jun. 20, 2014 (EP) .................................... 14173279

(51) Int. Cl.
*G06F 1/12* (2006.01)

(52) U.S. Cl.
CPC ...................................... *G06F 1/12* (2013.01)

(58) Field of Classification Search
None
See application file for complete search history.

(56) References Cited

U.S. PATENT DOCUMENTS

| | | | | |
|---|---|---|---|---|
| 5,544,202 A | * | 8/1996 | Jackson | ................... G09G 1/04 331/177 R |
| 2009/0183019 A1 | | 7/2009 | Allen et al. | |
| 2013/0250775 A1 | * | 9/2013 | Kim | ...................... H04L 7/0016 370/242 |

FOREIGN PATENT DOCUMENTS

WO 2013178237 A1 12/2016

OTHER PUBLICATIONS

International Search Report and Written Opinion issued in PCT/EP2015/064008, dated Sep. 2, 2015.

(Continued)

*Primary Examiner* — Paul Yen
(74) *Attorney, Agent, or Firm* — Heslin Rothenberg Farley & Mesiti P.C.

(57) ABSTRACT

A solution for synchronizing a network comprising a plurality of interconnected nodes provides a stable synchronized state, especially for large scale networks. Signal transmission speed and the length of each interconnection of the network is configured to cause a delay of the signals received by a node from the other node of the interconnection which is larger than one millionth of the free-running period of the controllable oscillator of the receiving node such that Network-wide synchronization of oscillators is (Continued)

achieved for all nodes of the network in a continuous self-organized process in interaction with the other node of the network.

15 Claims, 13 Drawing Sheets

(56) References Cited

OTHER PUBLICATIONS

Orsatti et al., "Mutually connected phase-locked loop networks: dynamical models and design parameters," IET Circuits Devices Syst., 2(6):495-508 (2008).
Pollakis et al., "Synchronization in networks of mutually delay-coupled phase-locked loops," New Journal of Physics, 16 (2014) 113009.
Orsatti et al., "Multiple synchronous states in static delay-free mutually connected PLL networks," Signal Processing 90:2072-2082 (2010).

* cited by examiner

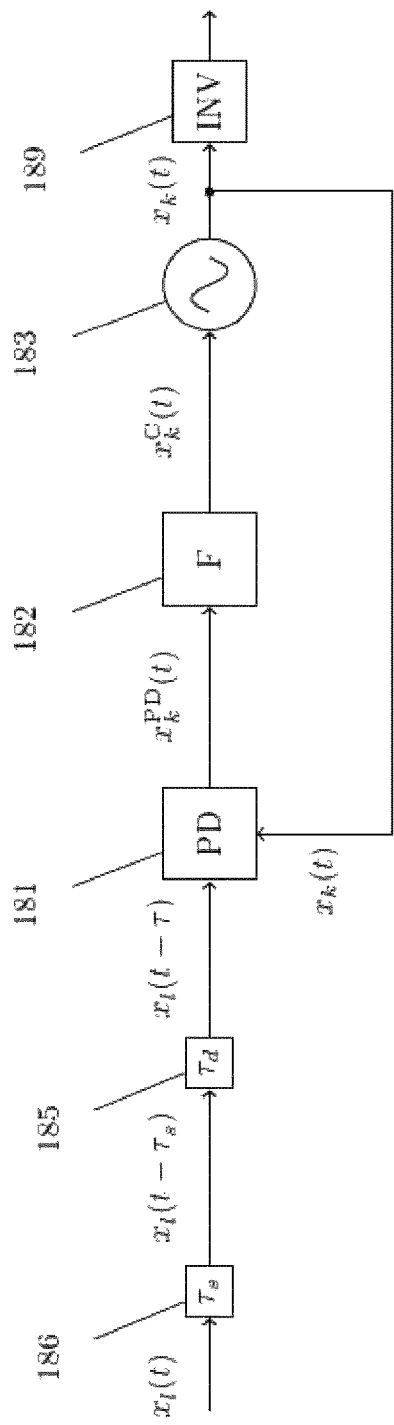

|                | $\omega/2\pi$ | $K_{VCO}/2\pi$ |
|---|---|---|
| DPLL #1 | 1008 Hz | 816 Hz |
| DPLL #2 | 1011 Hz | 813 Hz |
| Average | 1009.5 Hz | 814.5 Hz |
| Standard deviation | 0.21 % | 0.26 % |

| | |
|---|---|
| Filter cutoff frequency $\omega_c/2\pi$ | 14 Hz |
| Filter order $a$ | 1 |

Fig. 22

| DPLL no. | $\omega/2\pi$ [Hz] | $K^{VCO}/2\pi$ [Hz V$^{-1}$] |
|---|---|---|
| 1 | 1011 | 813 |
| 2 | 1008 | 816 |
| 3 | 1006 | 809 |
| 4 | 1029 | 845 |
| 5 | 971 | 833 |
| 6 | 996 | 804 |
| 7 | 996 | 796 |
| 8 | 937 | 787 |
| 9 | 1019 | 842 |
| Mean | 997 | 816 |
| Standard deviation | 2.8 % | 2.5 % |

| | |
|---|---|
| Filter cutoff frequency $\omega_c/2\pi$ | 14 Hz |
| Filter order $a$ | 1 |

Fig. 23

SELF-SYNCHRONIZABLE NETWORK

CROSS REFERENCE TO RELATED APPLICATIONS

This application is the National Phase filing under 35 U.S.C. § 371 of International Application No. PCT/EP2015/064008, filed on Jun. 22, 2015, and published on Dec. 23, 2015 as WO/2015/193512 A1, and claims priority to European Application No. 14173279.2, filed on Jun. 20, 2014. The contents of each of the prior applications are hereby incorporated by reference herein in their entirety.

FIELD OF THE INVENTION

The present invention relates to a synchronizable network comprising a plurality of nodes. The present invention specifically relates to clock distribution and self-organized synchronization in large scale networks, like high performance Multiprocessor System-on-Chips (MPSoCs) architectures, massive Multiple-Input Multiple-Output (MIMO) systems in mobile communications, multicore-processor applications, or GPU synchronization.

The present invention also relates to a method for synchronizing Network comprising a plurality of nodes.

BACKGROUND OF THE INVENTION

Enabled by sub-micrometer semiconductor device fabrication technologies MPSoCs have become a key component for modern communications and computation systems. Lately, the trend to integrate more and more processing cores in a single silicon die has gained momentum, aided by promising benefits in mechanical footprint, computational performance, energy and cost efficiency. Hence, increasing the number of cores directly translates into high performance through parallel processing and high efficiency compared to single-core solutions.

Nowadays, hundreds of thousands of cores are integrated on one single chip. To ensure a stable and well defined system a common synchronization strategy is to separate clocking of the processing blocks. The globally asynchronous locally synchronous (GALS) clocking yields a simplified clock tree and allows clock generation on-chip to minimize the number of required I/O pins. Hence, the clock frequencies and supply voltages, within a heterogeneous MPSoC, can be dynamically adjusted per core. However, the flexibility, scalability and other benefits of GALS clocking technique goes along with performance penalties caused by additional communication latencies between disjoint clock domains. This exactly describes the bottleneck of the GALS approach.

In contrast, for high performance microprocessors a globally synchronous design as shown in FIG. 1, where all cores (11) of a clocking network (13) share one master clock (12), is used. The communication latencies between cores are drastically reduced compared to GALS clocking. Considering next generation MPSoCs, a very large chip area has to be clocked synchronously. Implementing a master clock based clock tree, see FIG. 1, the clock signals within MPSoCs have to be transmitted over ranges of some millimeters, which is a well-known bottleneck for speed, power and reliability. Furthermore, traditional globally synchronous clocking circuits have become too difficult for large MPSoCs with many cores, constantly growing chip size and wire induced delays. In addition, the clock trees consume a significant amount of power which is critical for mobile communication systems.

Both clocking techniques, GALS and the globally synchronous design, reach their limits at large scale networks like massive Multiple-Input Multiple-Output (MIMO) systems and MPSoCs.

Another strategy for network synchronization and clock distribution relates to self-organized synchronization of distributed network nodes in absence of an entraining master clock.

"Mutually connected phase-locked loop networks: dynamical models and design parameters" by F. M. Orsatti, R. Carareto, J. R. C. Piqueira, IET Circuit Devices Syst., 2008, Vol. 2, No. 6, pp. 495-508 relates to distributing clock signals by using mutually connected architectures instead of master-slave type architectures. A mathematical model of mutually connected digital PLL networks is studied numerically; with the class of phase detectors restricted to JK flip flop phase detectors and charge-pump phase detectors. With the setup described in Orsatti et al., it is impossible to build a mutually connected network with three or more nodes by using XOR PDs. Additionally, signal transmission times are explicitly neglected. Conditions for the existence of synchronized states are derived, depending on individual node parameters and network connectivity, considering that the nodes are nonlinear oscillators with nonlinear coupling conditions.

"Multiple synchronous states in static delay-free mutually connected PLL networks" by F. M. Orsatti, R. Carareto, J. R. C. Piqueira, Signal Processing 90 (2010) 2072-2082 relates to mutually connected networks of digital phase-locked loops. A mathematical model of mutually connected digital PLL networks is studied numerically, with the class of phase detectors restricted to JK flip flop phase detectors. Even for static networks without delays, different synchronous states may exist for the network.

However, these papers deal with networks for which a time delay between oscillators is not present or negligible. Moreover, in both papers, the class of phase detectors is restricted to JK flip flop and/or charge-pump phase detectors. Hence, the solution presented there does not include networks with different types of phase detectors and cannot be applied to networks exhibiting a significant time delay between network nodes.

WO 2013/178237 A1 relates to a communication network of interconnected communication nodes, each node comprising an oscillator that is mutually coupled to oscillators of other communication nodes. The oscillator generates periodic synchronization pulses. The communication node further comprises a transmitter for transmitting the synchronization pulses to other communication nodes; a receiver for receiving synchronization pulses from other communication nodes; and a synchronization unit for synchronizing the phase of the synchronization pulses generated by the oscillator with the phase of the synchronization pulses received from other communication nodes by adjusting the phase of the synchronization pulses generated by the oscillator upon receipt of synchronization pulses from other communication nodes. The synchronization unit adjusts the phase of the synchronization pulses generated by the oscillator in such a way that a guaranteed network-wide synchronization is achieved for all communication nodes of the communication network.

However, WO 2013/178237 A1 explicitly limits a transmission time delay of the synchronization pulses between the communication nodes to one eighth of the period of the oscillator. Hence, this disclosure does not provide a suitable solution for networks exhibiting a transmission time delay exceeding one eighth of the period of the oscillator, e.g., highly integrated chip networks. Moreover, this solution assumes pulse coupling. Stochastic synchronization pulse emission is required to guarantee synchronization. Hence, this solution is not suitable for clock distributions with time-continuous coupling.

US 2009/183019 A1 relates to a system with multiple clock islands, each clock island clocked by a common clock generator. A predetermined amount of the clock skew may be introduced by programmable delay elements to smear out, over time, instantaneous power supply current demands of respective logic. Moreover, additional delayers are used to compensate for the clock skew between different clock islands for the purpose of information transmission.

Hence, US 2009/183019 A1 aims at establishing a clock skew in a system with a single clock generator using programmable delay elements.

DISCLOSURE OF THE INVENTION

It is an objective of the present invention to provide a solution for synchronizing a network comprising a plurality of interconnected nodes that provides a stable synchronized state, especially for large scale networks.

Here synchronized states relate to any state of the network with time-independent phase differences between the nodes of the network. In such a network, each node of the network receives at least one input from another node and transmits its output to at least another node.

This objective is achieved with a network of nodes according to the independent apparatus claim and a method for synchronizing a network according to the independent method claim.

The present invention relates to a network comprising a plurality of interconnected nodes. The node comprises a controllable oscillator generating a time-continuous synchronization signal for synchronizing the plurality of interconnected nodes of the network. The node further comprises a controller for comparing and synchronizing a phase of the time-continuous synchronization signal generated by the controllable oscillator with the phase of an external time-continuous synchronization signal received from another node of the network by adjusting a frequency of the time-continuous synchronization signal generated by the controllable oscillator. The external time-continuous synchronization signal received from the other node of the network is delayed with respect to the time-continuous synchronization signal transmitted by the other node by a time delay. Such delays can fulfill the function to enable synchronized states in such systems. The time delay may be a transmission time delay resulting from a transmission time between the transmission of the external time-continuous synchronization signal by the other node and the following receipt of the external time-continuous synchronization signal by the node. The transmission time-delay can be tuned adjusting the length of the connection transmitting the synchronization signal and taking into account the signal transmission speed. The time delay may also comprise any tunable additional time delays in addition to the transmission time delay.

The controller iteratively adjusts the frequency of the time-continuous synchronization signal generated by the controllable oscillator such that a network-wide synchronization of oscillators is achieved for all nodes of the network.

The synchronization is thus achieved in a continuous self-organized process through interactions of nodes in the network.

The controller may be any control system with feedback of the time-continuous synchronization signal generated by the tunable oscillator.

Specifically, the controller in combination with the controllable oscillator may form a phase locked loop (PLL). PLLs are electronic components able to synchronize their synchronization signals by evaluating mutual phase differences and adjusting their frequencies accordingly. The controller then comprises a phase detector (PD) and a loop filter (LF). The controllable oscillator may be a voltage controlled oscillator (VCO). The phase detector compares the phase of the external time-continuous synchronization signal with the phase of the time-continuous synchronization signal generated by the controllable oscillator. A tunable signal inverter can be placed in the feedback path between the controllable oscillator and the phase detector and/or in each input path and/or in the output path between the controllable oscillator and the input of at least another node.

A model for mutually coupled PLLs is described below using an analog PLL as an example. The present invention is not restricted to analog PLLs.

The VCOs output a sinusoidal with constant amplitude, which can be set to 1 without loss of generality, $$x_k(t)=\sin \phi_k(t) \qquad (1)$$

where $\phi_k(t)$ denotes the phase of the oscillatory signal and k=1, 2 indexes the PLL. The phase detector multiplies an external input signal $x_l$ with the output signal $x_k$ of the VCO. Time delays, for example resulting from transmission time delays and/or tunable additional time delays between the PLLs are accounted for by a delay $\tau$ of the received signal. Moreover, a feedback delay between the VCO and the PD is accounted for by a delay $\tau_f$ in the VCO signal. However, the feedback delay may be zero.

$$x_k^{PD}(t) = x_l(t-\tau) \cdot x_k(t-\tau_f) \qquad (2)$$

$$= \frac{1}{2}[\cos(\phi_l(t-\tau) - \phi_k(t-\tau_f)) - \cos(\phi_l(t-\tau) + \phi_k(t-\tau_f))]$$

This signal $x_k^{PD}$ is filtered by the loop filter $$x_k^C(t)=\int_0^\infty du\, p(u)x_k^{PD}(t-u) \qquad (3)$$

according to the impulse response p(u) of the LF. The output $x_k^C$ of the LF yields the control signal for the VCO. The dynamic frequency of the VCO is given by its intrinsic frequency $\omega$, which is modulated by the control signal $x_k^C$, $$\dot{\phi}_k(t)=\omega+K_{VCO}x_k^C(t) \qquad (4)$$

where $\dot{\phi}_k$ denotes the time-derivative of $\phi_k$ and $K_{VCO}$ is the sensitivity of the VCO. In Eq. (2), the first term containing a phase difference describes low frequency components of the signal, while the second term containing a sum of phases describes high frequency components. Approximating the LF as ideal, we omit the high frequency components in Eq. (2). Hence, the dynamic frequency of the VCO is given by $$\dot{\phi}_k(t)=\omega+K\int_0^\infty du\, p(u)\cos(\phi_l(t-\tau u)-\phi_k(t-\tau_f-u)) \qquad (5)$$

where $K=K_{VCO}/2$ is the coupling strength and has the dimension of a frequency. The cosine function containing the phase difference is called the coupling function. This is a closed phase equation for two mutually delay-coupled PLLs.

Eq. (5) can be extended to a phase model for N delay coupled PLLs with delays between coupled oscillators. A standard state-of-the-art PLL handles only a single input signal. The controller then compares and synchronizes a phase of the time-continuous synchronization signal generated by the controllable oscillator with the phases of external time-continuous synchronization signals received from a plurality of other nodes of the network by adjusting a frequency of the time-continuous synchronization signal generated by the controllable oscillator.

One aspect of the present invention relates to a combiner for combining external time-continuous synchronization signals received from other nodes of the network to generate a combined external time-continuous synchronization signal. The phase detector compares the phase of the time-continuous synchronization signal generated by the controllable oscillator with the phase of the combined external time-continuous synchronization signal. The combiner may be part of the phase detector (PD). The combiner may be a non-inverting adder. The phase detector (PD) may be a multiplier for analog signals or an XOR gate for digital signals. Alternatively, the phase detector may compare the phase of the time-continuous synchronization signal generated by the controllable oscillator with the phase of each external time-continuous synchronization signal individually to generate a plurality of phase detector signals. The combiner then combines the phase detector signals to control the controllable oscillator.

The phase model for N coupled analog PLLs reads $$\dot{\phi}_k(t) = \omega + \frac{K}{n_k}\sum_{l=1}^{N} d_{kl}\int_0^\infty du\, p(u)\cos(\phi_l(t-\tau-u) - \phi_k(t-\tau_f-u)) \quad (6)$$

The connections between PLLs are described by the coupling matrix $D=(d_{kl})$ with $d_{kl}\in\{0,1\}$, where $d_{kl}=1$ indicates a connection between k and l. The coupling strength is normalized by the number of input signals $$n_k = \sum_l d_{kl}.$$

Two examples of coupling matrices are given for global coupling with N=4 oscillators and for nearest-neighbor coupling on a 2×2 lattice with periodic boundary conditions:

$$D_{global} = \begin{pmatrix} 0 & 1 & 1 & 1 \\ 1 & 0 & 1 & 1 \\ 1 & 1 & 0 & 1 \\ 1 & 1 & 1 & 0 \end{pmatrix}, \quad D_{nearest-neighbor} = \begin{pmatrix} 0 & 1 & 0 & 1 \\ 1 & 0 & 1 & 0 \\ 0 & 1 & 0 & 1 \\ 1 & 0 & 1 & 0 \end{pmatrix} \quad (7)$$

For global in-phase synchronous states, the phase of all oscillators satisfy $$\phi_k(t) = \Omega t \,\forall k \quad (8)$$

where $\Omega$ denotes a collective frequency of a synchronized state. The collective frequency $\Omega$ satisfies $$\Omega = \omega + K\cos(\Omega[\tau - \tau_f]) \quad (9)$$

with $\int_0^\infty du\, p(u) = 1$, and $$\sum_l d_{kl} = n_k.$$

This result is valid for any coupling topology if there is no disjoint set of nodes.

One aspect of the present invention relates to tuning the time delay between coupled PLLs. A stable in-phase synchronized solution, Eq. (8), with global frequency $\Omega$ cannot be achieved for arbitrary time delays between coupled synchronizers. The time delay is a design parameter and can be tuned by an additional delayer and the design of the network. A node may comprise a delayer for inducing an additional time delay to a transmission time delay. The time delay effectively induces a frequency-dependent phase shift to a synchronization signal and, if appropriately tuned, changes the coupling properties such that stable synchronized states become possible. A delayer may be any means suitable to induce such phase shifts. The delayer may need to be specifically tuned for each input path.

The time delay may be of the order of a period of the controllable oscillator. Specifically, it may exceed one eighth of a period of the controllable oscillator. Thus, networks with large delays can be synchronized.

The node may further comprise a feedback delayer for inducing a feedback delay $\tau_f$ in a feedback path between the controllable oscillator and the phase detector. The feedback delay may compensate for the time delay. The node may further comprise a tunable signal inverter in each input path and/or in a feedback path between the controllable oscillator and the phase detector and/or a tunable signal inverter in an output path between the controllable oscillators for inducing a signal inversion. The collective frequency then depends on the difference between the time delay $\tau$ and the feedback delay $\tau_f$.

Furthermore, the time delay $\tau$ may be tuned such that it minimizes a perturbation response rate $\lambda$ in order to arrive at an in-phase synchronized state with maximum stability as will be explained.

For a phase perturbed by a perturbation $q_k(t)$, $$\phi_k(t) = \Omega t + \epsilon q_k(t)\,\forall k \quad (10)$$

where $\epsilon$ is small, Taylor expansion of Eq. (6) to first order in $\epsilon$ at $\epsilon=0$ yields the linear dynamics of the perturbation, $$\dot{q}_k(t) = \frac{\alpha}{n_k}\sum_{l=1}^{N} d_{kl}\int_0^\infty du\, p(u)[q_l(t-\tau-u) - q_k(t-\tau_f-u)] \quad (11)$$

where $$\alpha = K\sin(\Omega[\tau - \tau_f]) \quad (12)$$

Substituting the exponential ansatz $q_k(t) = c_k e^{\lambda t}$, where $\lambda$ is complex, into Eq. (11) the characteristic equation is given by $$\lambda c_k = \frac{\alpha}{n_k}\hat{p}(\lambda)\sum_{l=1}^{N} d_{kl}\left(c_l e^{-\lambda\tau} - c_k e^{-\lambda\tau_f}\right) \quad (13)$$

where $\hat{p}(\lambda) = \int_0^\infty du\, p(u)e^{-\lambda u}$ is the Laplace transform of the impulse response p(u) of the LF. The in-phase synchronized state Eq. (8) is linearly stable if and only if $\mathrm{Re}(\lambda) < 0$ for all solutions to Eq. (13). In the absence of a time delay $\tau$ and a feedback delay $\tau_f$, no stable synchronized can exist: for $\tau - \tau_f = 0$, Eq. (12) implies $\alpha = 0$ and Eq. (13) only permits the solution $\lambda = 0$. This indicates neutral stability, where any small perturbation persists. Hence, only a non-zero difference of time delay $\tau$ and a feedback delay $\tau_f$ allows for stable in-phase synchronized states. It shall be remarked that two unfavorable effects for in-phase synchronization (non-attractive coupling, time delay induced by transmission delay) combined yield a desirable technical effect.

Solutions for $\lambda$ can be obtained by rewriting Eq. (13) in vector form $$e^{\lambda \tau}\left(\frac{\lambda}{\alpha \hat{p}(\lambda)} + e^{-\lambda \tau_f}\right)c = \tilde{D}c \qquad (14)$$

with $c = (c_1, \ldots c_N)^T$ and the normalized coupling matrix $\tilde{D} = (\tilde{d}_{kl})$ with $\tilde{d}_{kl} d_{kl}/n_k$. For any solution $\lambda$, the scalar coefficient on the left hand side of Eq. (14) is an eigenvalue of $\tilde{D}$. A strategy to solve Eq. (14) is thus to solve the equation $e^{\lambda \tau}[\lambda/(\alpha \hat{p}(\lambda)) + e^{-\lambda \tau_f}] = \zeta$. The corresponding eigenvectors $c$ are related to the collective perturbation modes for which the linearized dynamics decouple.

A generalization of the phase model for N coupled PLLs with not necessarily identical specifications reads $$\dot{\phi}_k(t) = \qquad (15)$$

$$\omega_k + \frac{K_k}{n_k}\sum_{l=1}^{N} d_{kl} \int_0^\infty du\, p_k(u) h_k(\phi_l(t - \tau_{kl} - u) - \phi_k(t - \tau_{f,k} - u))$$

here $\omega_k$ is the intrinsic frequency, $K_k$ is the coupling strength, $p_k$ is the impulse response of the LF, $h_k$ is the coupling function (which is $2\pi$-periodic), $\tau_{f,k}$ is the feedback delay of PLL k and $\tau_{kl}$ is the time delay between PLLs k and l.

A synchronized state with time-independent phase differences between PLLs is given by $$\phi_k(t) = \Omega t + \beta_k \qquad (16)$$

where $\Omega$ denotes a collective frequency and $\beta_k$ is a phase offset of PLL k. If such a state exists, the collective frequency $\Omega$ and the phase offsets $\beta_k$ satisfy the N equations $$\Omega = \omega_k + K_k \sum_{l=1}^{N} \frac{d_{kl}}{n_k} h_k(-\Omega[\tau_{kl} - \tau_{f,k}] - \Delta_{kl}) \qquad (17)$$

where $k = 1, \ldots, N$ and $\Delta_{kl} = \beta_k - \beta_l$. For a phase perturbed by a perturbation $q_k(t)$, $$\phi_k(t) = \Omega t + \beta_k + \varepsilon q_k(t) \qquad (18)$$

where $\varepsilon$ is small, Taylor expansion of Eq. (15) to first order in $\varepsilon$ at $\varepsilon = 0$ yields the linear dynamics of the perturbation. As shown before, the characteristic equation for the perturbation response rate $\lambda$ can be obtained as $$\left(\frac{\lambda}{\hat{p}_k(\lambda)} + e^{-\lambda \tau_{f,k}} \sum_{l=1}^{N} \frac{d_{kl}}{n_k} K_k h_k'(-\Omega[\tau_{kl} - \tau_{f,k}] - \Delta_{kl})\right) c_k = \qquad (19)$$

$$\sum_{l=1}^{N} \frac{d_{kl}}{n_k} K_k h_k'(-\Omega[\tau_{kl} - \tau_{f,k}] - \Delta_{kl}) e^{-\lambda \tau_{kl}} c_l$$

where $h'_k$ denotes the derivative of $h_k$ with respect to its argument.

For the synchronized state to be stable, the same condition for $\lambda$ stated above has to be fulfilled.

Thus, for a desired collective frequency $\Omega$, the time delays $\tau_{kl}$ in combination with the feedback delays $\tau_{f,k}$ may be tuned such that a maximum perturbation decay can be achieved by optimizing the perturbation response rate $\lambda$, see Eq. (19). Moreover, further design parameters for optimizing the perturbation response rate $\lambda$ are the free running frequencies $\omega_k$ of the controllable oscillators, the coupling strengths $K_k$, the coupling functions $h_k$, and the impulse responses $p_k(u)$ of a filter within the controllers, i.e., the loop filter.

For systems, in which the specifications of individual PLLs only vary slightly, the system behavior can be well approximated by setting the intrinsic frequencies $\omega_k$, the coupling strengths $K_k$, the coupling functions $h_k$, the impulse responses $p_k$, and the feedback delays $\tau_{f,k}$ to k-independent values. For systems, in which the specifications of the interconnections between the PLLs only vary slightly, the system behavior can be well approximated by setting the time delays $\tau_{kl}$ to a k- and l-independent value.

One aspect of the present invention relates to optimizing the perturbation response by tuning the cut-off frequency of the loop filter. A large class of loop filters can be described by an impulse response p(t) given by the Gamma distribution, $$p(t) = t^{a-1}\frac{e^{-t/b}}{b^a \Gamma(a)} \qquad (20)$$

where $\Gamma$ is the Gamma function, a corresponds to the order of the utilized loop filter and, together with b, determines the cut-off frequency $\omega_c$ according to $\omega_c = (ab)^{-1}$. The transfer function of the filter is given by $$\hat{p}(\lambda) = (1 + \lambda b)^{-a} \qquad (21)$$

The time-continuous synchronization signal may be a digital signal or an analog signal. The node may be a clocking node and the time-continuous synchronization signal may be a clock signal for clocking a device. The present invention further relates to a network comprising a plurality of interconnected nodes that are continuously coupled. The network may be designed to yield a desired perturbation response rate and/or collective frequency. A design parameter of the network is the distance between a node and another node that contributes to the time delay. The time delay corresponding to an optimum perturbation response rate may be achieved either by adjusting the distance alone and/or the additional time delay induced by a delayer.

The present invention further relates to a method for synchronizing a network comprising a plurality of interconnected nodes. The method comprises generating a time-continuous synchronization signal in each node; transmitting the time-continuous synchronization signal of each node to at least one other respective node of the network; receiving in each node a delayed external time-continuous synchronization signal from the at least another node of the network; and synchronizing in each node a phase of the time-continuous synchronization signal with a phase of the external time-continuous synchronization signal received from the at least one other node by iteratively adjusting the frequency of the time-continuous synchronization signal such that a network-wide synchronization is achieved for all nodes of the network in a continuous self-organized process.

For the case of digital PLLs with XOR PDs, the coupling function h is given $h(\Phi)=\Lambda(\Phi)$, where $\Lambda$ is a triangular function whose Fourier representation is given by $$\Lambda(\Phi) = -\frac{8}{\pi^2}\sum_{i=0}^{\infty}\frac{\cos([2i+1]\Phi)}{(2i+1)^2} \quad (22)$$

For the case of identical specifications of the individual PLLs and interconnections between the PLLs and no delay in the feedback path, the collective frequency $\Omega$ of the in-phase synchronized state satisfies $$\Omega=\omega+KV(\Omega\tau) \quad (23)$$

The characteristic equation for the perturbation response rate $\lambda$ for this case is given by $$\lambda c_k = \frac{K\Lambda'(-\Omega\tau)}{n_k}\hat{p}(\lambda)\sum_{l=1}^{N}d_{kl}(c_l e^{-\lambda\tau}-c_k) \quad (24)$$

BRIEF DESCRIPTION OF THE DRAWINGS

Network, node and related method according to the invention are described in more detail herein below by way of exemplary embodiments and with reference to the attached drawings, in which:

FIG. 18 shows a block diagram of a network node comprising a PLL with a delayed input and a tunable inverter between the output of the controllable oscillator and the phase detector of at least another node according to a sixth embodiment;

FIG. 19 shows a block diagram of a network node comprising a PLL with a delayed input and tunable inverters in the feedback path between the controllable oscillator and the phase detector and in the output path according to a seventh embodiment;

FIG. 22 shows the specifications of the digital PLLs for which measurements are shown in FIGS. 12 to 15.

FIG. 23 shows the specifications of the digital PLLs for which measurements are shown in FIGS. 16 and 17.

DETAILED DESCRIPTION OF THE INVENTION

Figure 1:
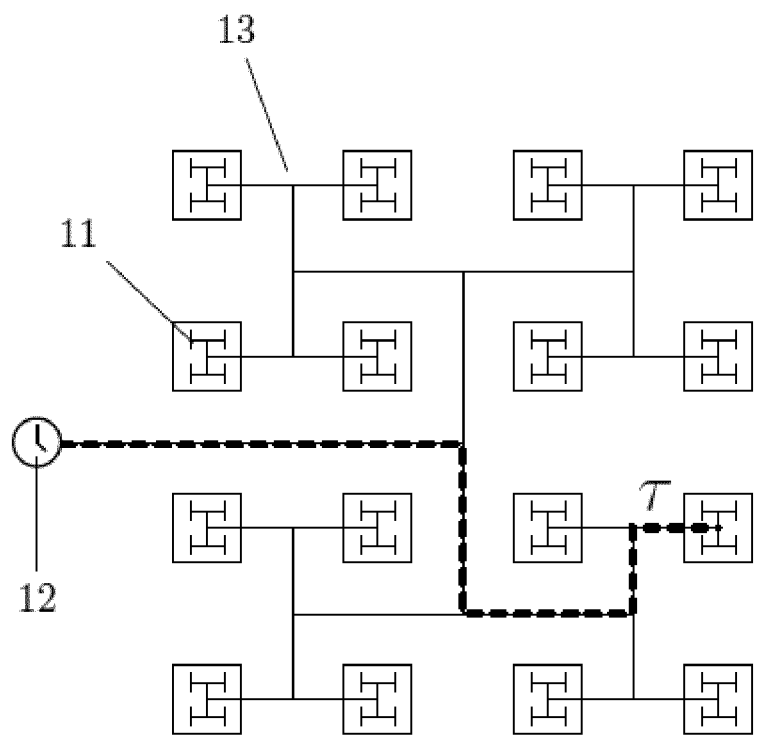
FIG. 1 shows a prior art approach for clock distribution on a globally synchronous network involving a master clock.
Figure 2:
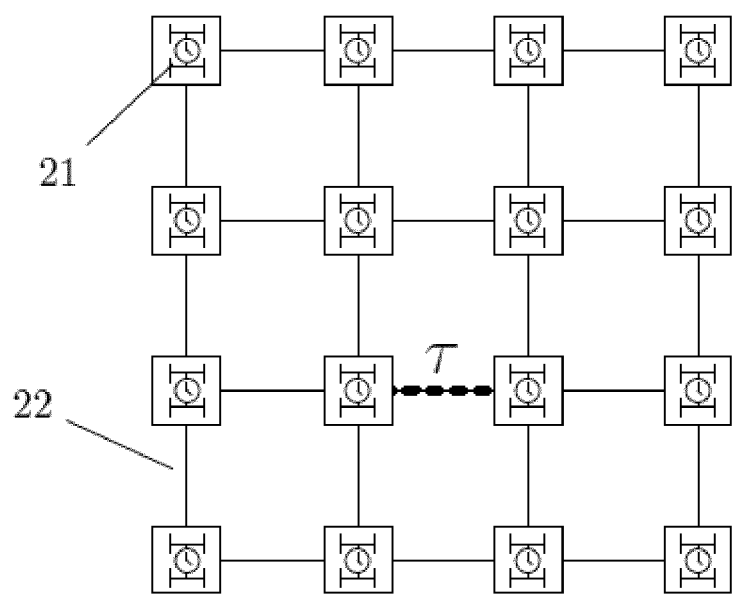
FIG. 2 shows a general approach of a dynamic clocking network involving mutually delay-coupled nodes, which are able to globally synchronize in a self-organized manner according to the invention.

FIG. 2 shows a dynamic clocking network 22 comprising a plurality of interconnected clocking nodes 21 that are continuously delay-coupled. Each clocking node is implemented as a PLL. Thus, the clocking network 22 is network of mutually delay-coupled PLLs with continuous coupling.

Figure 3:
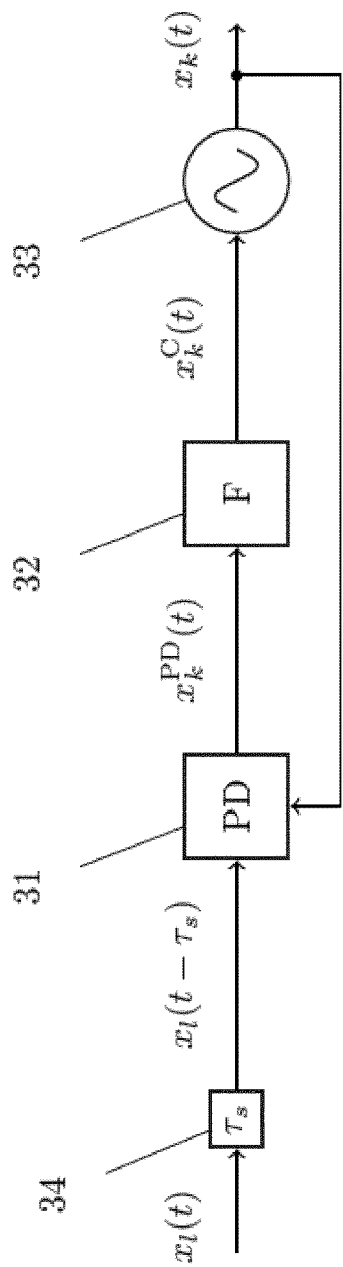
FIG. 3 shows a block diagram of a network node comprising a PLL with a delayed input according to a first embodiment.

Referring to FIG. 3, the PLL comprises a phase detector 31, a loop filter 32 and a voltage controlled oscillator 33 that generates a time-continuous clocking signal $x_k(t)$. The PLL synchronizes the phase of the clocking signal generated by the VCO 33 with the phase of the external clocking signal $x_l(t-\tau_s)$ which is delayed by the transmission time delay $\tau_s$, indicated by transmission delayer 34, by adjusting the frequency of the clocking signal of the VCO such that a network-wide synchronization of the VCOs is achieved for all clocking nodes of the dynamic clocking network. To do so, the phase detector 31 compares the phase of the external clocking signal $x_l(t-\tau_s)$ with the phase of the clocking signal $x_k(t)$ generated by the VCO 33 to generate phase detector signal $x_k^{PD}(t)$. After filtering with the loop filter 32 this yields the control signal $x_k^C(t)$ for the VCO 33.

Figure 4:
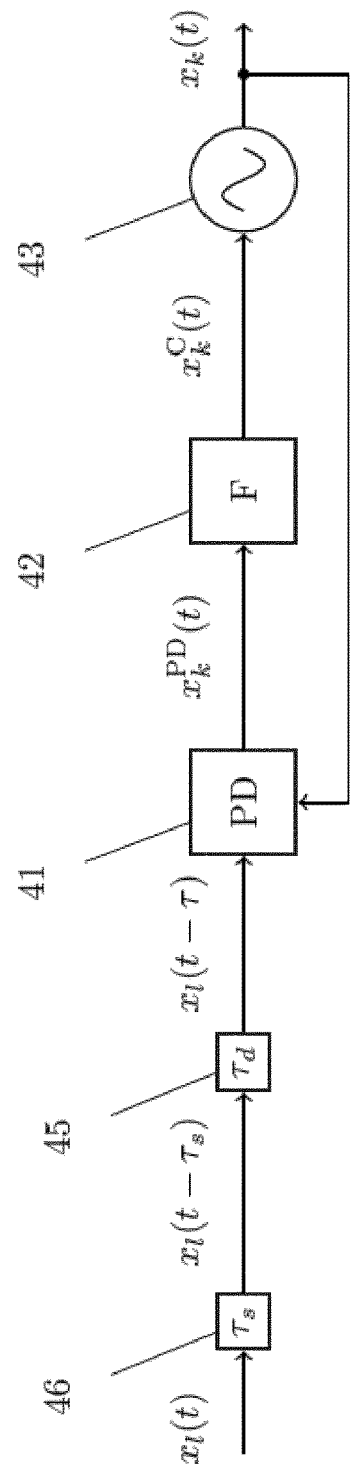
FIG. 4 shows a block diagram of a network node comprising a delay-coupled PLL with a delayed input and an additional delayer in the input path according to a second embodiment.

FIG. 4 shows the node of FIG. 3 comprising an additional delayer 45 in the input path to adjust the time delay. Transmission time delay $\tau_s$ and additional time delay $\tau_d$ yield the time delay $\tau$. The phase detector 41 compares the phase of the additionally delayed external clocking signal $x_l(t-\tau)$ with the phase of the clocking signal $x_k(t)$ generated by the VCO 43 to generate the phase detector signal $x_k^{PD}(t)$. After filtering with the loop filter 42 this yields the control signal $x_k^C(t)$ for the VCO 43. By properly inducing an additional time delay, stable solutions for the collective frequency of the network can be achieved.

Figure 5:
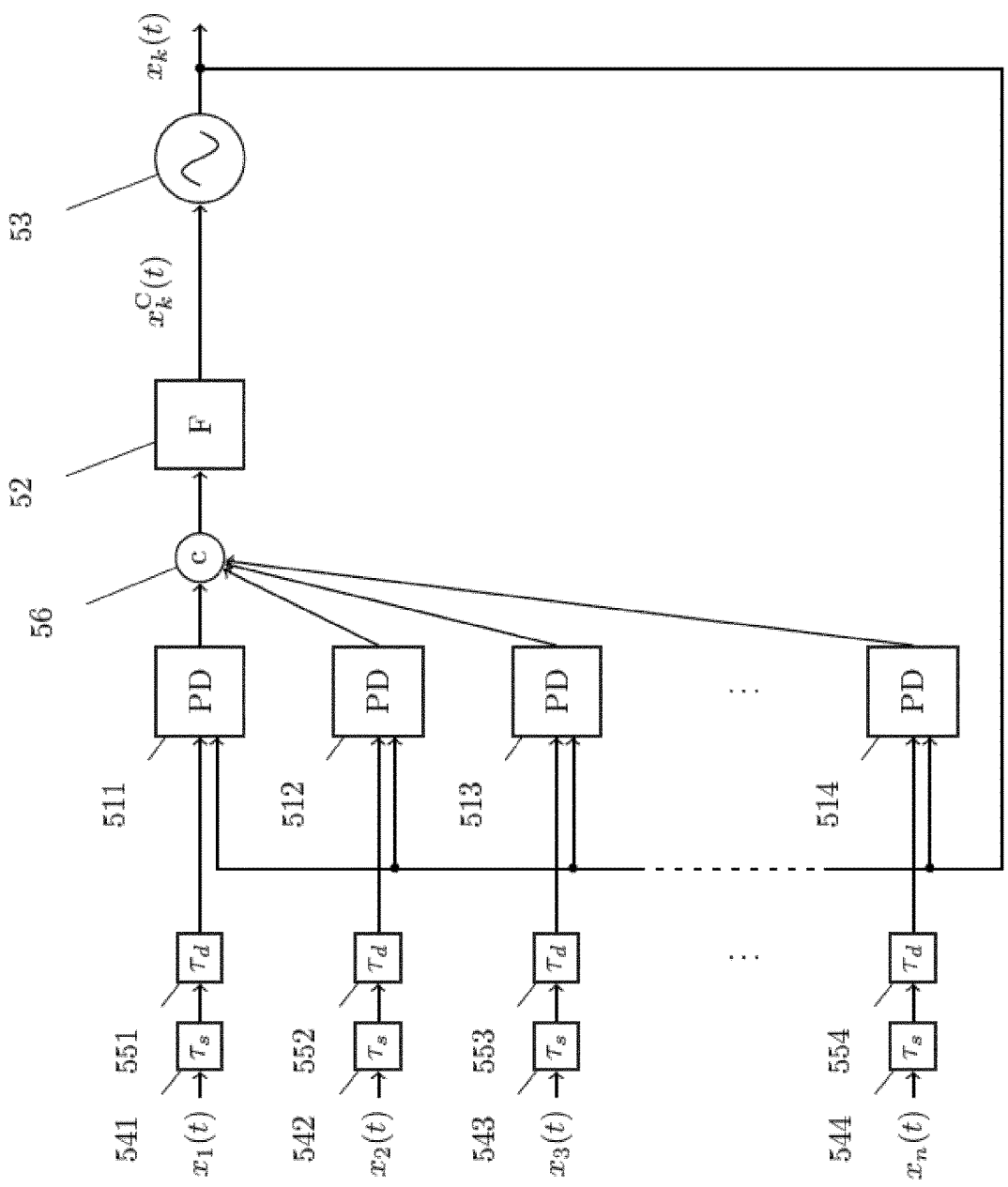
FIG. 5 shows a block diagram of a network node comprising a delay-coupled PLL with delayed inputs, an additional delayer for each input and a combiner to combine a plurality of phase detector signals according to a third embodiment.

FIG. 5 shows a clocking node with a plurality of external clocking signals $x_1(t), x_2(t), x_3(t), \ldots, x_n(t)$. Each input path comprises an individual delayer 551, 552, 553, 554 that induces an additional time delay to the transmission time delay indicated by transmission delayers 541, 542, 543, 544. Each phase detector 511, 512, 513, 514 compares the phase of the clocking signal $x_k(t)$ generated by the controllable oscillator 53 with the phase of each external clock signal individually to generate a plurality of phase detector signals. The combiner 56 combines the phase detector signals to generate a combined phase detector signal to control the controllable oscillator. The combined phase detector signal is filtered by the loop filter 52 to yield the control signal $x_k^C(t)$ for the VCO. The PLL of each clocking node thus adjusts the frequency of the clocking signal of each VCO such that a network-wide synchronization of the VCOs is achieved for all clocking nodes of the dynamic clocking network. By properly inducing individual additional time delays to each input path, stable solutions for the collective frequency of the network can be achieved.

Figure 6:
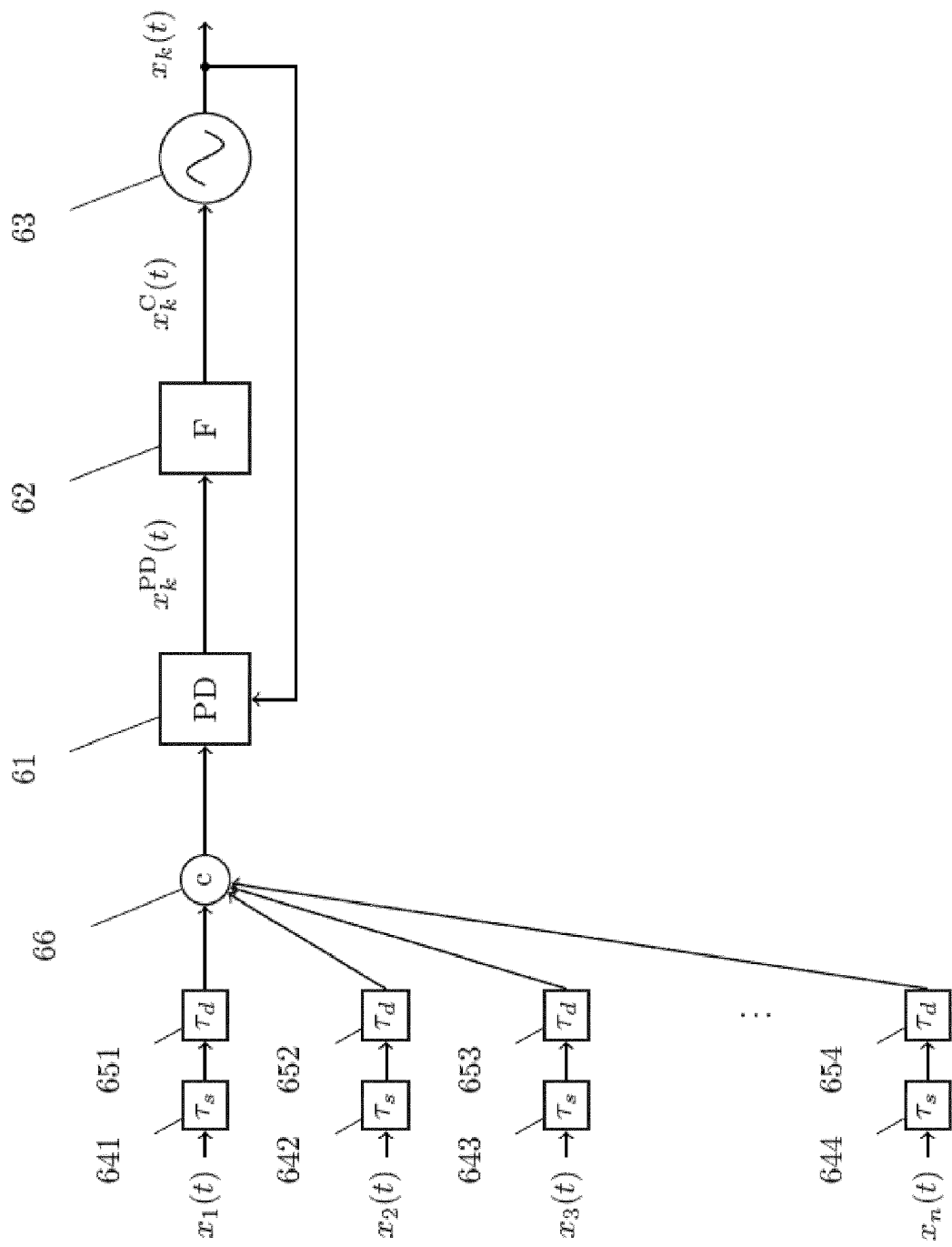
FIG. 6 shows a block diagram of a network node comprising a delay-coupled PLL with delayed inputs, an additional delayer for each input and a combiner to combine a plurality of input signals according to a fourth embodiment.

FIG. 6 shows a clocking node with a plurality of external clocking signals $x_1(t), x_2(t), x_3(t), \ldots, x_n(t)$. Each input path comprises an individual delayer 651, 652, 653, 654 that induces an additional time delay to the transmission time delay indicated by transmission delayers 641, 642, 643, 644. In contrast to the embodiment as shown in FIG. 5, where a combiner combines a plurality of phase detector signals, in this embodiment the combiner 66 combines the plurality of external clocking signals to generate a combined external clocking signal. The phase detector 61 compares the phase of the clocking signal generated by the VCO 63 with the phase of the combined external clocking signal to generate the phase detector signal $x_k^{PD}(t)$. After filtering with the loop filter 62 this yields the control signal $x_k^C(t)$ for the VCO 63.

Figure 7:
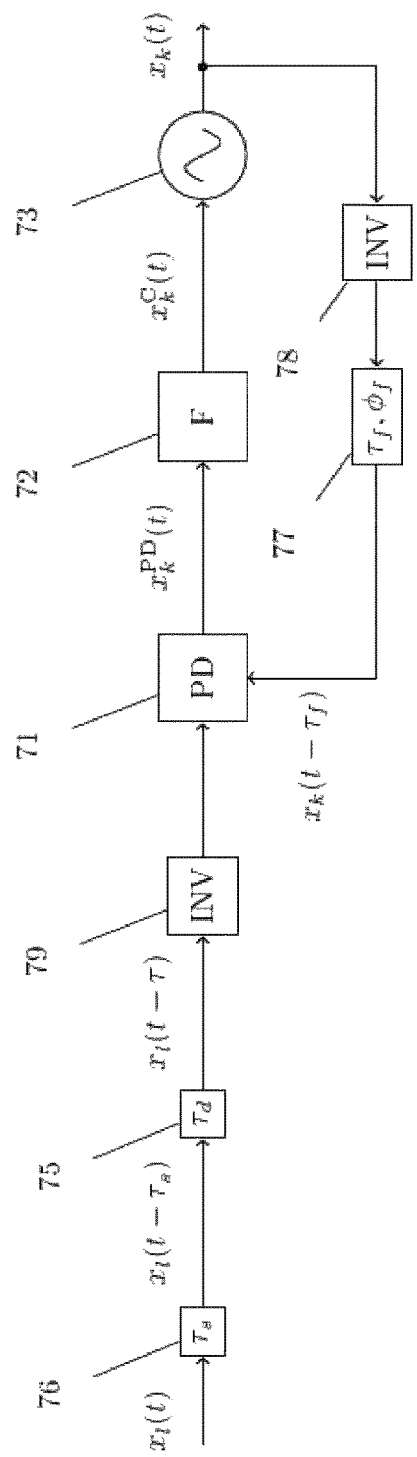
FIG. 7 shows a block diagram of a network node comprising a delay-coupled PLL with a delayed input and a feedback delayer and tunable inverters according to fifth embodiment.

FIG. 7 shows the clocking node of FIG. 4 comprising a feedback delayer 77 for introducing a time delay in the feedback loop, a tunable inverter 78 for introducing a signal inversion in the feedback path between the controllable oscillator and the phase detector, and a tunable inverter 79 in the input path of the PLL comprising the phase detector 71, loop filter 72 and VCO 73. The feedback delay may be induced to compensate for a time delay.

Figure 8:
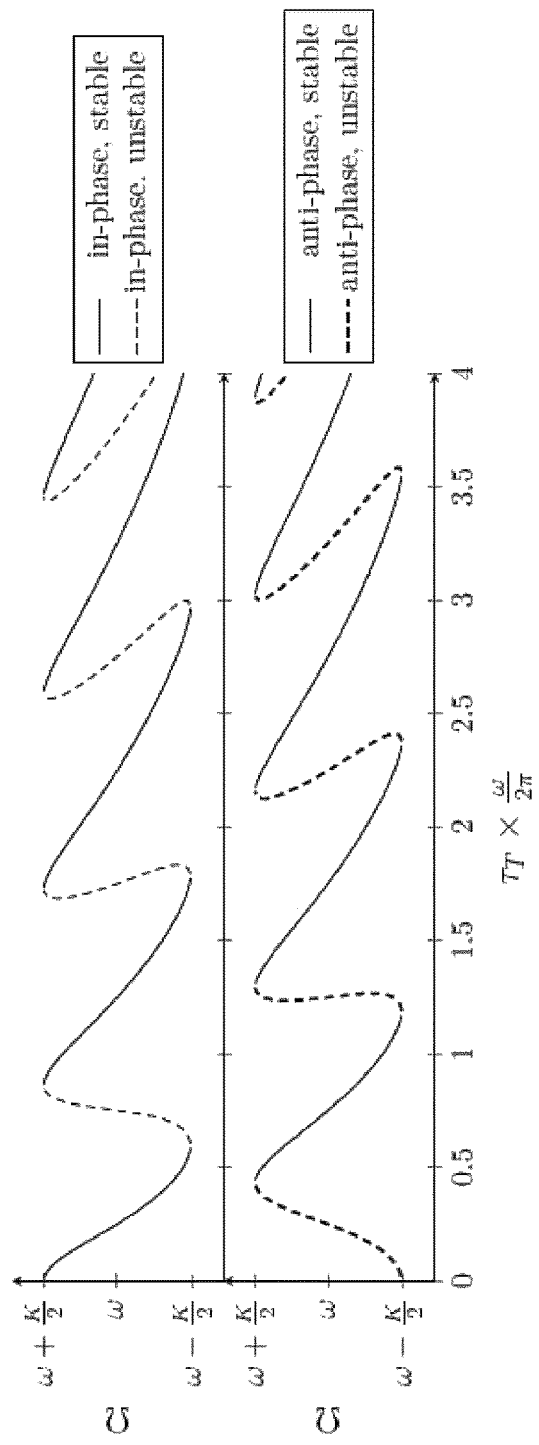
FIG. 8 shows a diagram showing a global frequency of the in-phase and anti-phase synchronized state versus the transmission delay for a system of delay-coupled analog PLLs.
Figure 9:
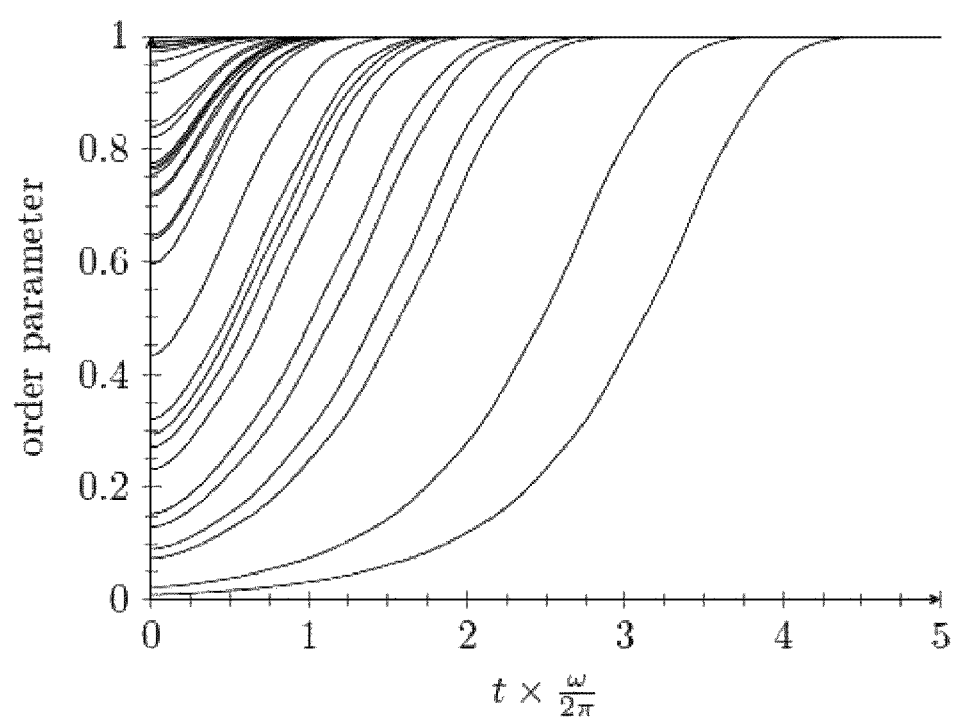
FIG. 9 shows a diagram showing global synchrony measured using the Kuramoto order parameter as a function of time.

The individual time delays $\tau$ in any of the described embodiments are design parameters. Only if chosen properly, a stable synchronous state can be achieved as will be explained with reference to FIG. 8 which shows the global frequency $\Omega$ of the in-phase and anti-phase synchronized state as a function of the time delay $\tau$ for a clocking network comprising two analog PLLs as clocking nodes. The anti-phase synchronized state is characterized by $\phi_1(t)=\phi_2(t)-\pi$. Full lines denote stable solutions and dashed lines denote unstable solutions. Hence, for a desired global frequency of the clocking network, the time delay can be chosen for a given free running frequency of the VCO in order to achieve a desired synchronous state and global frequency of the network. If no additional time delay is induced, the transmission time delay corresponds to the time delay. Thus, by choosing the distances between the coupled nodes of the network accordingly, a transmission time delay can be achieved that yields a stable synchronous state. The curves of FIG. 8 are shown for the following system parameters: VCO free running frequency $\omega=2\pi\times3.55$ GHz, coupling strength $K=2\pi\times1.11$ GHz, LF order $a=1$, LF cut-off frequency $\omega_c=2\pi\times355$ MHz. The frequencies of the different solutions can be obtained by letting the clocking network evolve from different initial phase differences. For example, for $\tau=0.2\times2\pi/\omega$, all initial phase differences lead to the in-phase synchronized state, see FIG. 9, wherein an order parameter of zero means no synchrony and wherein a value of one implies full synchrony. For values of the time delay for which both solutions are stable, the clock network evolves towards one solution according to its initial condition. Moreover, the time delay, the intrinsic frequencies, the coupling strengths, the filter responses, the feedback delays, and the state of the inverters may be chosen such that a perturbation response rate given by $\text{Re}(\lambda)$ is minimized, see Eq. (14).

Figure 10:
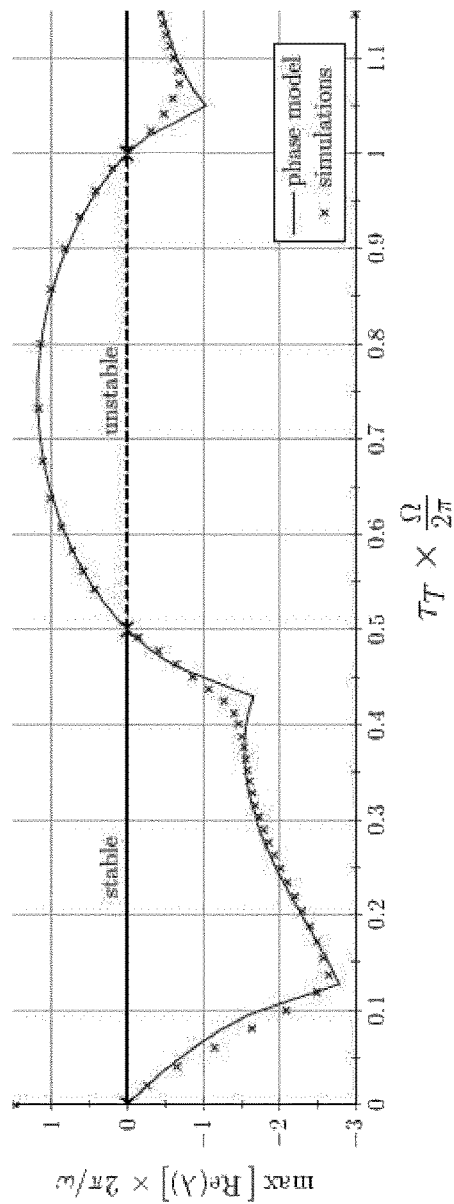
FIG. 10 shows a diagram showing the perturbation response rate versus the transmission delay for a system of delay-coupled analog PLLs.

FIG. 10 shows a diagram showing the perturbation response rate versus the time delay of a clocking network comprising two analog PLLs as clocking nodes. The coupling matrix corresponding to two mutually coupled PLLs is given by $$\tilde{D} = \begin{pmatrix} 0 & 1 \\ 1 & 0 \end{pmatrix}$$

and has eigenvalues $\zeta_1=1$ and $\zeta_2=-1$. It shows a distinct minimum in the region of stable solutions which corresponds to a time delay that is optimal with respect to the perturbation response rate. It shall be mentioned that for a desired global frequency, a maximum perturbation decay of the clock network can be achieved by simultaneously adjusting the time delay and the free running frequency of the VCO, which shifts the curve of the global frequency, see FIG. 8, up or down. The coupling strength and the cut-off frequency of the loop filter also affect the stability of the clock network. The curves are shown for the same parameters as in FIG. 8.

Figure 11:
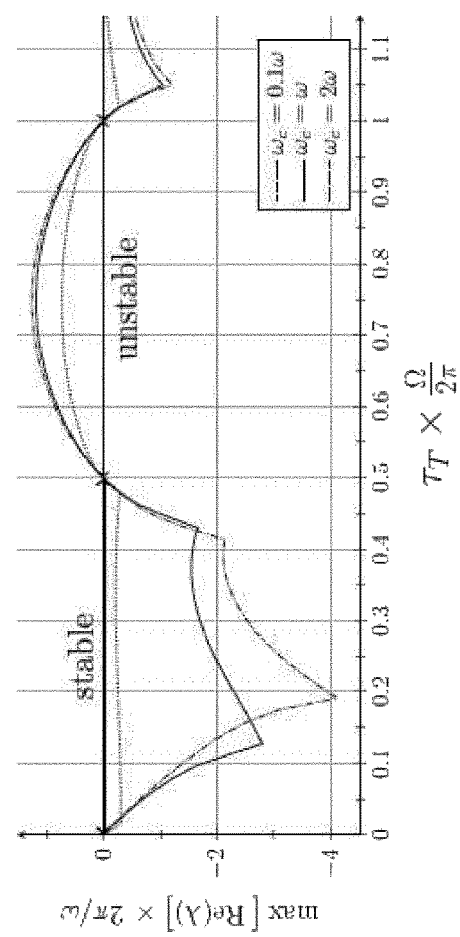
FIG. 11 shows a diagram showing the perturbation response rate versus the transmission delay for different cut-off frequencies of the loop filter for a system of delay-coupled analog PLLs.

FIG. 11 shows the perturbation response rate versus the time delay of a clocking network comprising two analog PLLs as clocking nodes for different cut-off frequencies of the loop filter. Thus, by properly tuning the time delay in combination with the cut-off frequency a minimum perturbation response rate can be achieved.

The present invention proposes a novel synchronization strategy, specifically for spatially distributed clocks. These clocks are synchronized by networks of coupled phase-locked loops. An important feature is the time delay in the time-continuous coupling between phase-looked loops which enables synchronized states in the presence of a coupling mechanism that does not permit stable synchronized states for negligible time delays and a non-attractive coupling mechanism. As the transmission time delay is not limited to one eighth of a period of the oscillator as is the case with the solution disclosed in WO 2013/178237 A1, networks with larger time delays between nodes can be synchronized. Important applications are, e.g., high performance MPSoCs architectures, distributed antenna arrays, and other large scale electronic clocking systems communicating by means of time-continuous signals. The present invention specifically provides a simplified clock network compared to the prior art tree structure. The synchronized network thus enables an increased energy efficiency due to shorter connections and less amplification. Moreover, it exhibits increased robustness towards failure of individual components due to a decentralized architecture. Furthermore, the synchronized network is designed for high quality of oscillations. The synchronized network can be realized using readily available hardware components. Thus, this solution works with readily available hardware combined in a novel way and additionally simplifies clock distribution, thereby reducing power consumption and increasing scalability.

Figure 12:
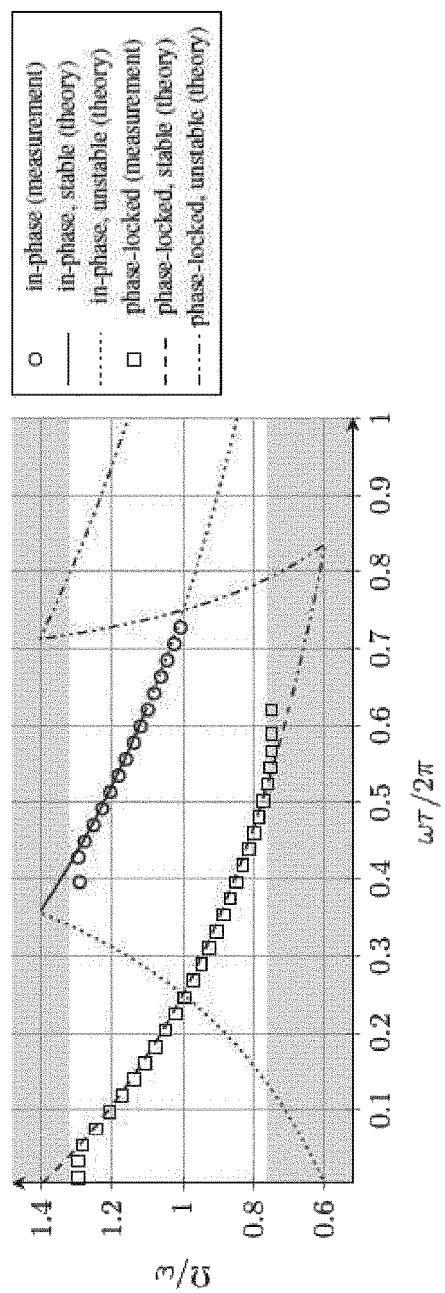
FIG. 12 shows a diagram showing a global frequency of the in-phase and/or phase-locked anti-phase synchronized state versus the transmission delay in a system of two delay-coupled digital PLLs.

FIG. 12 shows the global frequency $\Omega$ of the in-phase and phase-locked (here anti-phase) synchronized state as a function of the time delay $\tau$ for a clocking network comprising two digital PLLs as clocking nodes. The curves of FIG. 12 are obtained using the phase model for digital PLLs. They are shown for the following system parameters: VCO free running frequency $\omega=2\pi\times1009.5$ Hz, coupling strength $K_{VCO}=2\pi\times814.5$ Hz, LF order a=1, LF cut-off frequency $\omega_c=2\pi\times14$ Hz. The symbols show data points measured in an experimental setup with two digital PLLs whose specifications are given in FIG. 22.

Figure 13:
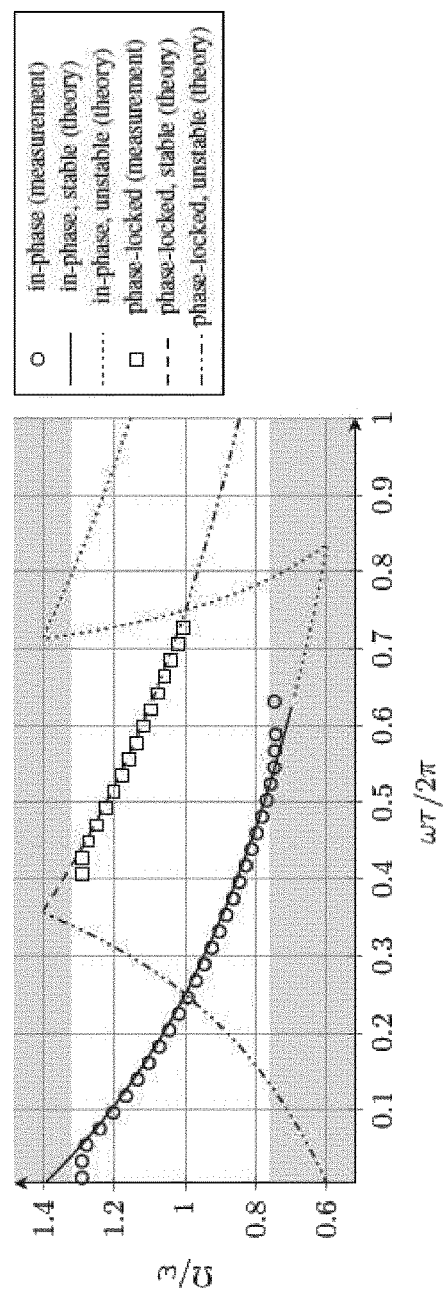
FIG. 13 shows a diagram showing a global frequency of the in-phase and phase-locked anti-phase synchronized state versus the transmission delay in a system of two delay-coupled digital PLLs with an active inverter in the feedback path between controllable oscillator and phase detector.

FIG. 13 shows the global frequency $\Omega$ of the in-phase and phase-locked (here anti-phase) synchronized state as a function of the time delay $\tau$ for a clocking network comprising two digital PLLs as clocking nodes with an active inverter in the feedback path between controllable oscillator and phase detector. The curves of FIG. 13 are obtained using the phase model for digital PLLs. They are shown for the following system parameters: VCO free running frequency $\omega=2\pi\times1009.5$ Hz, coupling strength $K=2\pi\times814.5$ Hz, LF order a=1, LF cut-off frequency $\omega_c=2\pi\times14$ Hz. The symbols show data points measured in an experimental setup with two digital PLLs whose specifications are given in FIG. 22.

Figure 14:
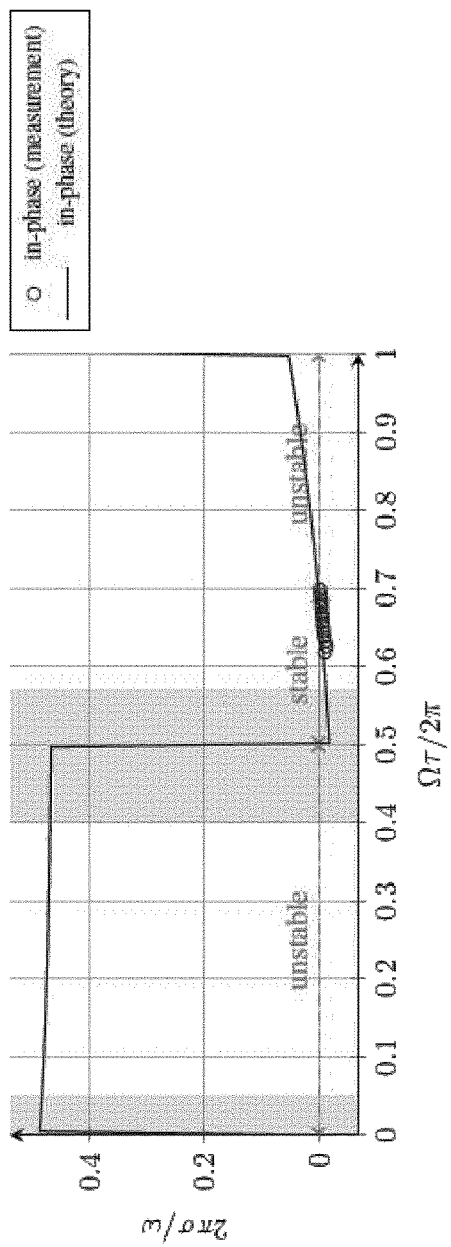
FIG. 14 shows a diagram showing the perturbation response rate versus the transmission delay for a system of two delay-coupled digital PLLs.

FIG. 14 shows a diagram showing the perturbation response rate versus the time delay for a clocking network comprising two digital PLLs as clocking nodes. The curves of FIG. 14 are obtained using the phase model for digital PLLs. They are shown for the same parameters as in FIG. 12. The symbols show data points measured in an experimental setup with two digital PLLs whose specifications are given in FIG. 22.

Figure 15:
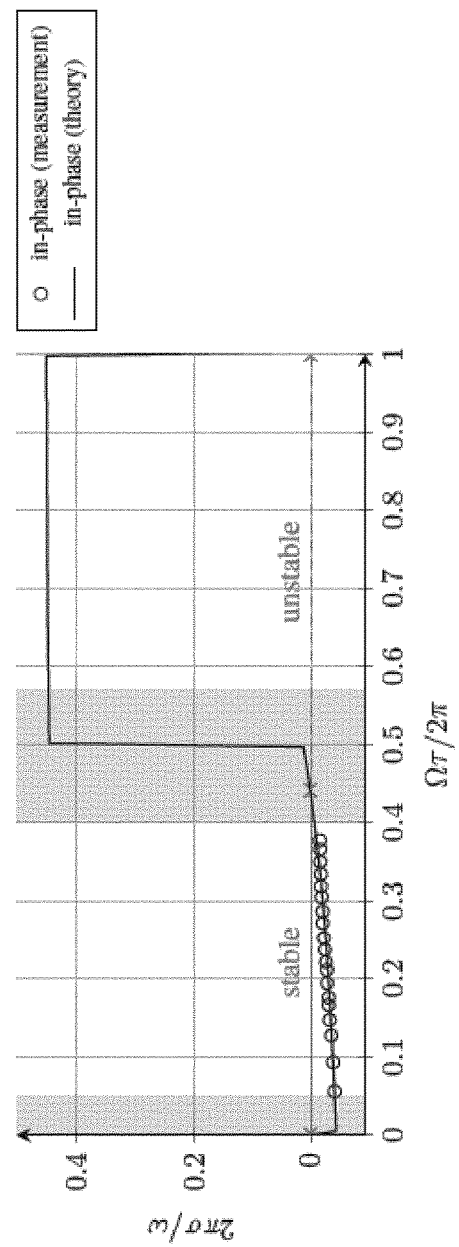
FIG. 15 shows a diagram showing the perturbation response rate versus the transmission delay for a system of two delay-coupled digital PLLs with an active inverter in the feedback path between controllable oscillator and phase detector.

FIG. 15 shows a diagram showing the perturbation response rate versus the time delay for a clocking network comprising two digital PLLs as clocking nodes with an active inverter in the feedback path between controllable oscillator and phase detector. The curves of FIG. 15 are obtained using the phase model for digital PLLs. They are shown for the same parameters as in FIG. 13. The symbols show data points measured in an experimental setup with two digital PLLs whose specifications are given in FIG. 22.

Figure 16:
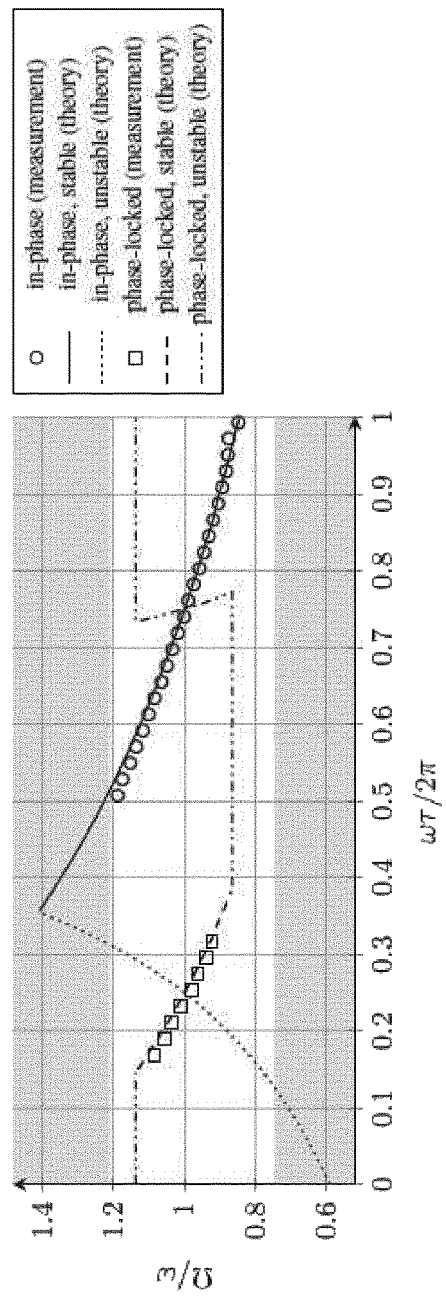
FIG. 16 shows a diagram showing a global frequency of the in-phase and a phase-locked synchronized state versus the transmission delay in a system of nine delay-coupled digital PLLs on a 3×3 square lattice with periodic boundaries.

FIG. 16 shows the global frequency $\Omega$ of the in-phase and a phase-locked synchronized state, in which there is a phase difference of $2\pi/3$ between coupled nodes, as a function of the time delay $\tau$ for a clocking network comprising nine digital PLLs on a 3×3 square lattice with periodic boundaries as clocking nodes. The curves of FIG. 16 are obtained using the phase model for digital PLLs. They are shown for the following system parameters: VCO free running frequency $\omega=2\pi\times997$ Hz, coupling strength $K_{VCO}=2\pi\times816$ Hz, LF order a=1, LF cut-off frequency $\omega_c=2\pi\times4$ Hz. The symbols show data points measured in an experimental setup with nine digital PLLs on a 3×3 square lattice with periodic boundaries whose specifications are given in FIG. 23.

Figure 17:
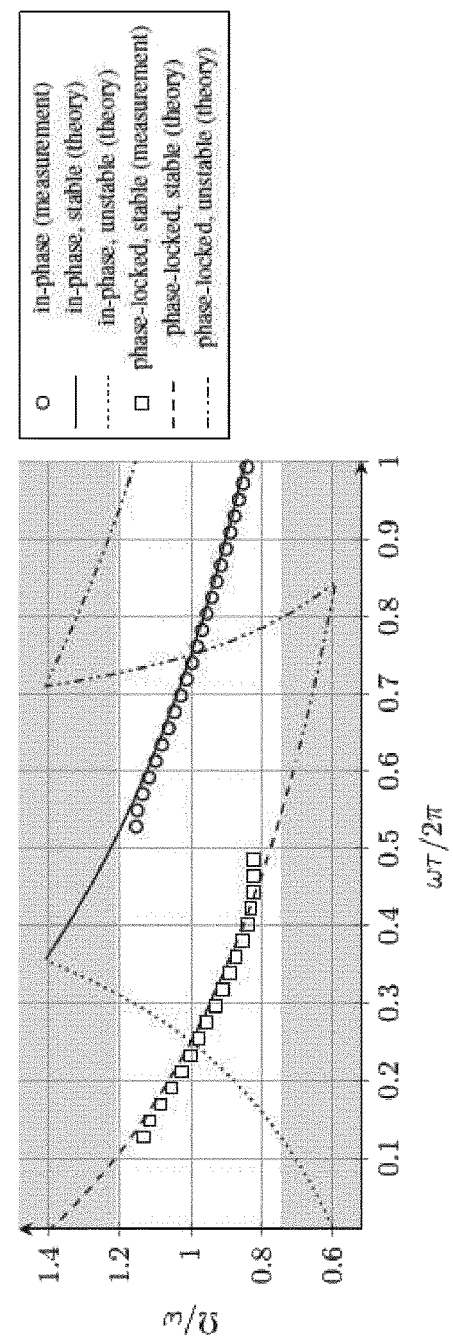
FIG. 17 shows a diagram showing a global frequency of the in-phase and a phase-locked synchronized state versus the transmission delay in a system of nine delay-coupled digital PLLs on a 3×3 square lattice with open boundaries.

FIG. 17 shows the global frequency $\Omega$ of the in-phase and a phase-locked synchronized state, in which there is a phase difference of $\pi$ between coupled nodes, as a function of the time delay $\tau$ for a clocking network comprising nine digital PLLs on a 3×3 square lattice with open boundaries as clocking nodes. The curves of FIG. 17 are obtained using the phase model for digital PLLs. They are shown for the following system parameters: VCO free running frequency $\omega=2\pi\times997$ Hz, coupling strength $K_{VCO}=2\pi\times816$ Hz, LF order a=1, LF cut-off frequency $\omega_c=2\pi\times14$ Hz. The symbols show data points measured in an experimental setup with nine digital PLLs on a 3×3 square lattice with open boundaries whose specifications are given in FIG. 23.

FIG. 18 shows the clocking node of FIG. 4 comprising a tunable inverter 189 for introducing a signal inversion in the output path between the controllable oscillator of the PLL and the phase detector of at least another node.

FIG. 19 shows the clocking node of FIG. 4 comprising a tunable inverter 199 for introducing a signal inversion in the output path between the controllable oscillator of the PLL and the phase detector of at least another node and a tunable inverter 198 for introducing a signal inversion in the in the feedback path between the controllable oscillator and the phase detector.

Figure 20:
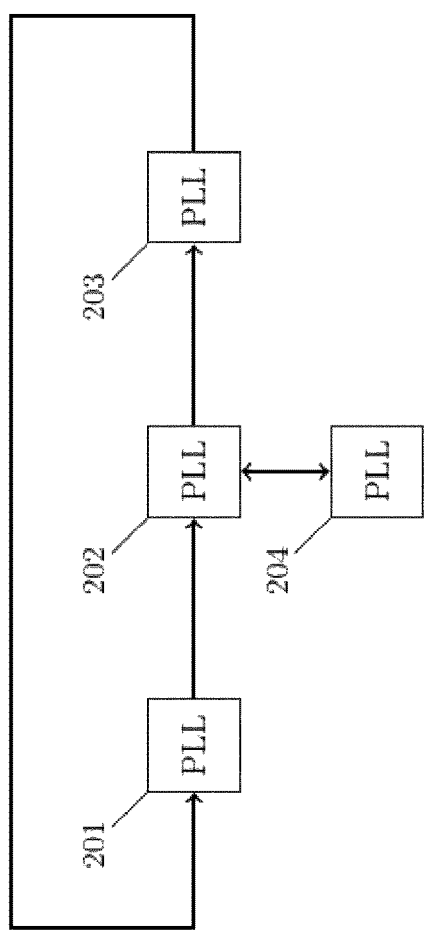
FIG. 20 shows an approach of a dynamic clocking network involving delay-coupled nodes with both unidirectional and bidirectional interconnections, which are able to globally synchronize in a self-organized manner according to an eighth embodiment.

FIG. 20 shows a dynamic clocking network comprising a plurality of interconnected clocking nodes 201, 202, 203, 204 that are continuously delay-coupled. Each clocking node is implemented as a PLL. The interconnections between the clocking nodes 201, 202, 203 are unidirectional, whereas the interconnection between the clocking nodes 202 and 204 is bidirectional. Hence, a clocking network of delay-coupled PLLs with continuous coupling can contain both unidirectional and bidirectional interconnections.

Figure 21:
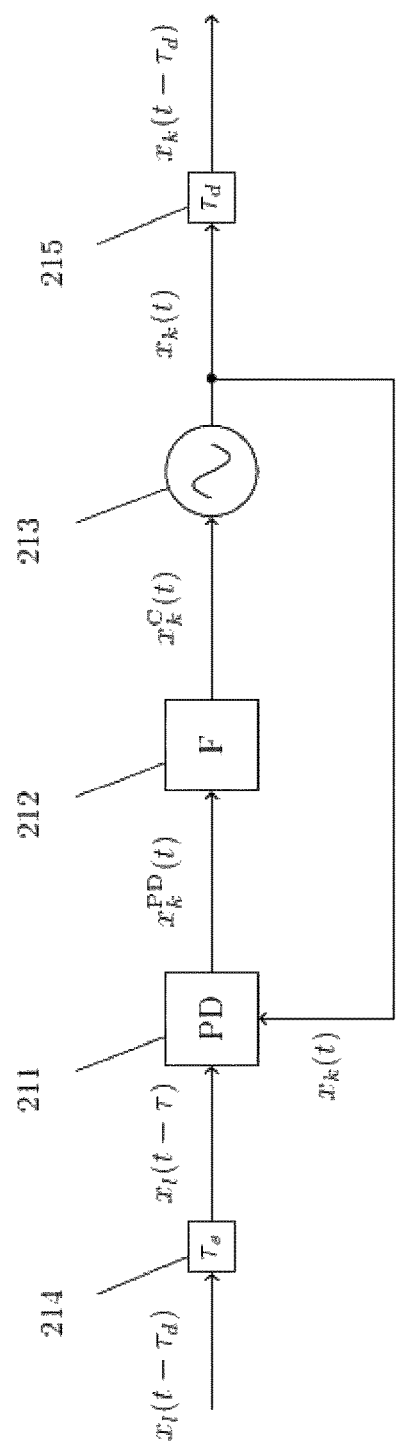
FIG. 21 shows a block diagram of a network node comprising a PLL with a delayed input and an additional delayer in the output path according to a ninth second embodiment.

FIG. 21 shows the node of FIG. 3 comprising an additional delayer 215 in the output path between the controllable oscillator and the phase detector of at least another node to adjust the time delay.

FIG. 22 shows the specifications of the digital PLLs for which measurements are shown in FIGS. 12 to 15.

FIG. 23 shows the specifications of the digital PLLs for which measurements are shown in FIGS. 16 and 17.

The invention claimed is:

1. A network comprising a plurality of nodes, wherein each of the nodes is interconnected with at least another node of the network such that an output of a first node is connected to an input of a second node and an output of the second node and/or a third node is connected to an input of the first node; each node comprising:
    a. a controllable oscillator configured to generate a time-continuous synchronization signal for synchronizing the plurality of the interconnected nodes of the network;
    b. a controller configured to compare and synchronize a phase of the time-continuous synchronization signal generated by the controllable oscillator with a phase of an external time-continuous synchronization signal received from another node or the plurality of other nodes in the network by adjusting a frequency of the time-continuous synchronization signal generated by the controllable oscillator, the controller being further configured to iteratively adjust a frequency of the time-continuous synchronization signal generated by the controllable oscillator;

c. wherein signal transmission speed and length of each interconnection of the network is configured to cause a delay of the signals received by a node from the another node or the plurality of other nodes of the network which is larger than one millionth of the free-running period of the controllable oscillator of the receiving node such that network-wide synchronization of oscillators is achieved for all nodes of the network in a continuous self-organized process in interaction with the another node or the plurality of other nodes of the network.

2. The network according to claim 1, wherein each node comprises an additional delayer is arranged within the interconnection or realized by the controller.

3. The network according to claim 1, wherein, in each node, a feedback delay $\tau_{f,k}$, a free running frequency $\omega_k$ of the controllable oscillator, a coupling strength $K_k$, an impulse response $p_k(u)$ of a filter within a controller, a delay $\tau_{kl}$ comprising a delay $\tau_s$ caused by the length of an interconnection and a delay $\tau_d$ optionally caused by a delayer are configured such that the phase-differences relative to a phase-locked synchronized state are continuously decreased.

4. The network (22) according to claim 3, wherein, in each node, a feedback delay $\tau_{f,k}$, a free running frequency $\omega_k$ of the controllable oscillator, a coupling strength $K_k$, an impulse response $p_k(u)$ of a filter within a controller, a delay $\tau_{kl}$ comprising a delay $\tau_s$ caused by the length of an interconnection and a delay $\tau_d$ optionally caused by a delayer are configured such that all solutions in $\lambda$ to equations $$\left( \frac{\lambda}{\hat{p}_k(\lambda)} + e^{-\lambda \tau_{f,k}} \sum_{l=1}^{N} \frac{d_{kl}}{n_k} K_k h'_k(-\Omega[\tau_{kl} - \tau_{f,k}] - \Delta_{kl}) \right) c_k =$$

$$\sum_{l=1}^{N} \frac{d_{kl}}{n_k} K_k h'_k(-\Omega[\tau_{kl} - \tau_{f,k}] - \Delta_{kl}) e^{-\lambda \tau_{kl}} c_l$$

satisfy Re($\lambda$)<0, where $d_{kl}$ indicates the interconnection between node k and l.

5. The network according to claim 1, wherein, in each node, the controller comprises a phase detector configured to compare the phase of the external time-continuous synchronization signal with the phase of the time-continuous synchronization signal generated by the controllable oscillator.

6. The network according to claim 5, wherein each node further comprises a combiner to combine the external time-continuous synchronization signals received from other nodes of the network to generate a combined external time-continuous synchronization signal and wherein the phase detector compares the phase of the time-continuous synchronization signal generated by the controllable oscillator with the phase of the combined external time-continuous synchronization signal.

7. The network according to claim 5, wherein in each node the phase detector (511, 512, 513, 514) is configured to compare the phase of the time-continuous synchronization signal generated by the controllable oscillator with the phase of each external time-continuous synchronization signal individually to generate a plurality of phase detector signals; and wherein the combiner (56) combines the phase detector signals to control the controllable oscillator (53).

8. The network according to claim 3, wherein each node comprises a plurality of delayers for inducing an additional time delay in addition to a transmission time delay to yield the delay for each received external time-continuous synchronization signal.

9. The network according to claim 1, wherein each controller comprises a combiner.

10. The network according to claim 1, wherein each node comprises a feedback delayer for inducing a feedback time delay in a feedback path between the controllable oscillator and the phase detector and at least one of: (i) a first tunable signal inverter for inverting the feedback signal in a feedback path between the controllable oscillator and the phase detector, (ii) a second tunable signal inverter for inverting the input signal in an input path, and (iii) a third tunable signal inverter for inverting the output signal in an output path between a controllable oscillator and the phase detector of at least another node.

11. The network according to claim 1 wherein each node is a clocking node and wherein the time-continuous synchronization signal is a clock signal for clocking a device.

12. A method for synchronizing a network comprising a plurality of nodes, wherein each of the nodes is interconnected with at least another node of the network such that an output of a first node is connected to an input of a second node and an output of the second node and/or a third node is connected to an input of the first node; comprising the steps of:

a. generating a time-continuous synchronization signal for synchronizing the plurality of the interconnected nodes of the network in each node by a controllable oscillator;

b. comparing and synchronizing a phase of the time-continuous synchronization signal generated by the controllable oscillator by a controller, which is transmitted to another node or the plurality of other nodes of the network, with a phase of an external time-continuous synchronization signal received from the another node or the plurality of other nodes of the network by adjusting a frequency of the time-continuous synchronization signal generated by the controllable oscillator, c. iteratively adjusting a frequency of the time-continuous synchronization signal generated by the controllable oscillator, d. wherein signal transmission speed and the length of each interconnection of the network is configured to cause a delay of the signals received by a node from the another node or the plurality of other nodes of the network which is larger than one millionth of the free-running period of the controllable oscillator of the receiving node such that network-wide synchronization of oscillators is achieved for all nodes of the network in a continuous self-organized process in interaction with the another node or the plurality of other nodes of the network.

13. The method for synchronizing the network according to claim 12, wherein, in each node, the phase of the external time-continuous synchronization signal is compared with the phase of the time-continuous synchronization signal generated by the controllable oscillator.

14. The method for synchronizing the network according to claim 12, wherein, in each node, the controller compares and synchronizes a phase of the time-continuous synchronization signal generated by the controllable oscillator, which is transmitted to the another node or the plurality of other nodes of the network, with the phases of external time-continuous synchronization signals received from the another node or the plurality of other nodes of the network by adjusting a frequency of the time-continuous synchronization signal generated by the controllable oscillator, wherein the external time-continuous synchronization signals received from the another node or the plurality of other nodes of the network are delayed with respect to the time-continuous synchronization signal transmitted by the another node or the plurality of other nodes by a time delay; and wherein the controller iteratively adjusts the frequency of the time-continuous synchronization signal generated by the controllable oscillator such that network-wide synchronization of oscillators is achieved for all nodes of the network in a continuous self-organized process in interaction with the another node or the plurality of other nodes of the network.

15. The method according to claim 12, wherein, in each node, a phase detector compares the phase of the time-continuous synchronization signal generated by the controllable oscillator with the phase of each external time-continuous synchronization signal individually to generate a plurality of phase detector signals; and wherein a combiner combines the phase detector signals to control a controllable oscillator.

* * * * *